(12) United States Patent
Alemany (10) Patent No.: US 7,472,085 B2
(45) Date of Patent: Dec. 30, 2008

(54) APPARATUS AND METHOD FOR DATA INTERCHANGE

(75) Inventor: Manuel Alemany, Scottsdale, AZ (US)

(73) Assignee: Loffa Interactive Corp. Inc., Scottsdale, AZ (US)

( * ) Notice: Subject to any disclaimer, the term of this patent is extended or adjusted under 35 U.S.C. 154(b) by 1171 days.

(21) Appl. No.: 10/374,154

(22) Filed: Feb. 25, 2003

(65) Prior Publication Data

US 2004/0167865 A1   Aug. 26, 2004

(51) Int. Cl.
*G06Q 40/00* (2006.01)
(52) U.S. Cl. .............................. 705/35; 705/38; 705/37; 705/36; 705/26
(58) Field of Classification Search ............. 705/35–38, 705/26
See application file for complete search history.

(56) References Cited

U.S. PATENT DOCUMENTS 6,021,397 A * 2/2000 Jones et al. ............... 705/36 R 2001/0042785 A1 * 11/2001 Walker et al. ............... 235/379
2004/0117302 A1 * 6/2004 Weichert et al. .............. 705/40

OTHER PUBLICATIONS

Improving productivity with short-interval scheduling Walter J Strutt. AACE International Transactions. Morgantown: 2001. p. PS31, 11 pgs☐.*

* cited by examiner

*Primary Examiner*—Frantzy Poinvil
*Assistant Examiner*—Clement Graham
(74) *Attorney, Agent, or Firm*—Wright Law Group PLLC; Mark F. Wright (57) ABSTRACT

An apparatus and method for data interchange provides a universal transaction mechanism for translating and sharing data, particularly financial data, thereby streamlining the exchange of financial information and approvals typically utilized in many brokerage transactions, including the verification of free funds through an electronic Letter of Free Funds in compliance with Regulation T and related government-mandated rules and requirements.

30 Claims, 4 Drawing Sheets

APPARATUS AND METHOD FOR DATA INTERCHANGE

BACKGROUND OF THE INVENTION

1. Technical Field

The present invention relates generally to data transfer and more particularly to the interchange of specific information and documentation for activities such as brokerage account transactions verification.

2. Background Art

Financial Broker/Dealers are part of a highly regulated, high profile, situation-driven business. Specifically, each transaction completed by a Broker/Dealer is subject to a myriad of federal regulations and government oversight. These rules include those such as "Regulation T" (12 C.F.R. § 220.8(a)(2)(ii)). In particular, Regulation T, and related rules, as promulgated and enforced by the Security and Exchange Commission, is not to be taken lightly. Regulation T is designed to prevent "free riding" situations and requires Broker/Dealers to verify funds availability in conjunction with each and every securities trade that they are involved with.

In order to comply with Regulation T for typical industry standard Delivery Versus Payment (DVP) transactions, the Broker/Dealer must follow a pre-determined series of steps. For example, whenever a client desires to conduct a DVP transaction with a Broker/Dealer that doesn't already hold the necessary client assets to consummate the desired transaction in an account at their brokerage firm, the Broker/Dealer is required to request and receive a "Letter of Free Funds" authorization from the custodian Broker/Dealer managing the client account that will be providing the funds for the desired transaction. The Letter of Free Funds authorization is a basically a document certifying whether or not the client has enough funds and securities available in his/her brokerage account at the custodian Broker/Dealer's firm to adequately fund the desired transaction. Except in certain very limited circumstances, without this authorization from the custodian Broker/Dealer, the desired transaction cannot take place.

The process generally used to verify the availability of funds via a Letter of Free Funds authorization is somewhat arcane and inefficient. Typically, the requesting Broker/Dealer will make the request via phone or, alternatively, physically transfer the request via courier or fax to the custodian Broker/Dealer requesting the Letter of Free Funds authorization. Then, after receipt of the request, the custodian Broker/Dealer will review the specified client's account to verify whether or not the necessary funds are available for the desired transaction.

If indeed the necessary funds are available, then the custodian Broker/Dealer will send the appropriate Letter of Free Fund authorization forms back to the requesting Broker/Dealer. If, however, the necessary funds are not available, then the custodian Broker/Dealer will send back a notification to the requesting Broker/Dealer to indicate a lack of funds to complete the desired transaction. These return notification documents are typically transferred via fax or courier. Obviously, this process can be cumbersome and error-prone as well as inefficient.

Although there have been several attempts to alleviate the bottlenecks and difficulties inherent in the currently used Regulation T compliance processes, they have not met with much acceptance in the marketplace. For example, the Depository Trust and Clearing Corporation (DTCC) provides an electronic option for generating Letter of Free Funds to use in standard brokerage transaction. While touted as being "electronic, the DTCC process actually requires custodians to manually verify incoming information and, accordingly, may be prone to the typical human errors associated with review, transcription and data entry. Philosophically, this process may appear to be a step in the right direction, but the manual nature of the process can actually be counter-productive and less efficient than the traditional process. Accordingly, the DTCC system it is not widely accepted. Additionally, the DTCC system and is probably too narrow in application and proprietary in nature to develop a broader base of users.

As shown by the discussion presented herein, the current constraints on data transfer and utilization in the area of financial transactions have throttled desired improvements in the rapidly accelerating pace of doing business. Additionally, mandatory compliance with rapidly evolving, government-mandated rules and regulations will tend to further exacerbate an already inefficient process. As new rules and rulings are adopted, the broker/dealer community must constantly re-evaluate their processes and adjust to meet the new requirements. Accordingly, unless further improvements and enhancements are made in the techniques and methods used to exchange the types of data required in typical brokerage transactions, the flow of information, and by extension money, in typical brokerage transaction systems will remain sub-optimal.

BRIEF SUMMARY OF THE INVENTION

An apparatus and method for data interchange provides a universal transaction mechanism for translating and sharing data, particularly financial data, thereby streamlining the exchange of financial information and approvals typically utilized in many brokerage transactions, including the verification of free funds through an electronic Letter of Free Funds in compliance with Regulation T and related government-mandated rules and requirements.

BRIEF DESCRIPTION OF THE DRAWINGS

The preferred embodiments of the present invention will hereinafter be described in conjunction with the appended drawings, wherein like designations denote like elements, and.

DETAILED DESCRIPTION OF THE INVENTION

The apparatus and method for data interchange described herein provides a universal transaction mechanism for translating and sharing data, particularly financial data, thereby streamlining the exchange of financial information and approvals typically utilized in many brokerage transactions, including the verification of free funds through an electronic Letter of Free Funds in compliance with Regulation T and related government-mandated rules and requirements.

Figure 1:
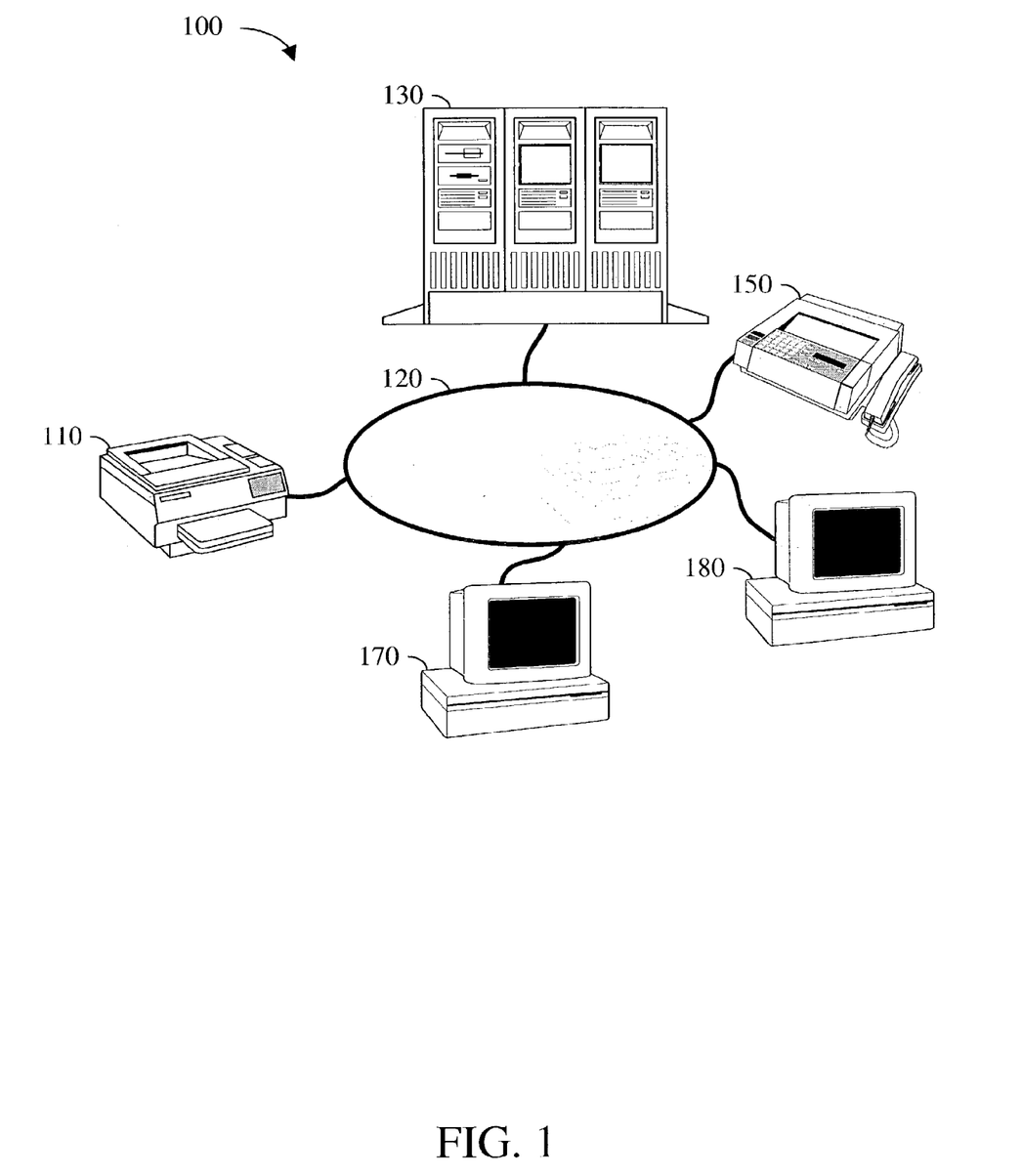
FIG. 1 is a block diagram of a data interchange system in accordance with a preferred exemplary embodiment of the present invention.

Referring now to FIG. 1, a data interchange system 100 in accordance with a preferred embodiment of the present invention typically includes: a data transaction server 130; a requesting broker computer system 170; and a custodian broker computer system 180, all connected via network a 120. Additionally, an optional printer 110 and an optional fax machine 150 are shown. Taken together, data interchange system 100 provides a way for broker dealers to more efficiently and effectively complete various types of data interchange, including Letters of Free Funds for compliance with Regulation T.

Data transaction server 130 represents a relatively powerful computer system that is made available to requesting broker computer system 170 and custodian broker computer system 180 via network 120. Various hardware components (not shown this FIG.) such as hard disk drives, recordable CD-ROM/DVD drives, jukeboxes, magnetic tapes, and other devices known to those skilled in the art may be used in conjunction with data transaction server 130. Data transaction server 130 is further described in conjunction with FIG. 2.

Requesting broker computer system 170 may be any type of computer system known to those skilled in the art that is capable of being configured for use with data interchange system 100 as described herein. This includes laptop computers, desktop computers, tablet computers and the like. Additionally, handheld and palmtop devices are also specifically included within the description of devices that may be deployed as a requesting broker computer system 170. It should be noted that no specific operating system or hardware platform is excluded and it is anticipated that many different hardware and software platforms may be configured to create a suitable requesting broker computer system 170. As previously explained in conjunction with data transaction server 130, various hardware components (not shown this FIG.) such as hard disk drives, recordable CD-ROM/DVD drives, jukeboxes, magnetic tapes, and other devices known to those skilled in the art may be used in conjunction with requesting broker computer system 170.

Similarly, custodian broker computer system 180 may be any type of computer system known to those skilled in the art that is capable of being configured for use with data interchange system 100 as described herein. This includes laptop computers, desktop computers, tablet computers and the like. Additionally, handheld and palmtop devices are also specifically included within the description of devices that may be deployed as a custodian broker computer system 180. It should be noted that no specific operating system or hardware platform is excluded and it is anticipated that many different hardware and software platforms may be configured to create a suitable custodian broker computer system 180. As previously explained in conjunction with data transaction server 130, various hardware components (not shown this FIG.) such as hard disk drives, recordable CD-ROM/DVD drives, jukeboxes, magnetic tapes, and other devices known to those skilled in the art may be used in conjunction with custodian broker computer system 180.

Network 120 is any suitable computer communication link or communication mechanism, including a hardwired connection, an internal or external bus, a connection for telephone access via a modem or high-speed T1 line, infrared or other wireless communications, computer network communications over the Internet or an internal network (e.g. "intranet") via a wired or wireless connection, or any other suitable connection between computers and computer components known to those skilled in the art, whether currently known or developed in the future. It should be noted that portions of network 120 may suitably include a dial-up phone connection, broadcast cable transmission line, Digital Subscriber Line (DSL), ISDN line, or similar public utility-like access link.

In the most preferred embodiments of the present invention, network 120 represents and comprises a standard Internet connection between the various components of data interchange system 100. Regardless of physical nature and topology, network 120 serves to logically link the physical components of data transaction system 100 together, regardless of their physical proximity. This is especially important because in many preferred embodiments of the present invention, data transaction server 130, requesting broker computer system 170, and custodian broker computer system 180 will be geographically remote.

In general, data transaction server 130 processes requests for various transactions between requesting broker computer system 170 and custodian broker computer system 180. A typical transaction may be represented by a Letter of Free Funds request. In this case, a verification of funds availability is sent from requesting broker computer system 170 to data transaction server 130. Data transaction server 130 processed the request, formats the request for processing by custodian broker computer system 180 and transfers the request to custodian broker computer system 180.

Similarly, data transaction server 130 receives responses from custodian broker computer system 180 regarding the Letter of Free Funds request, processes the response, formats the response for processing by requesting broker computer system 170 and then transmits the response to requesting broker computer system 170. It should be noted that the roles of requesting broker computer system 170 and custodian broker computer system 180 may be interchanged, depending on which system initiates the request. Additionally, it should be noted that while FIG. 1 shows only a single broker computer system 170 and a single custodian broker computer system 180, it is anticipated that the most preferred embodiments of the present invention will comprise hundreds and even thousands of broker computer systems 170 and custodian broker computer systems 180.

In the most preferred embodiments of the present invention, multiple requesting broker computer systems 170 and custodian broker computer systems 180 will all be configured to communicate with data transaction server 130 and with each other via network 120. In addition, the most preferred embodiments of the present invention include an Application Service Provider (ASP) environment where data transaction server 130 is operated as a clearinghouse in a hosted operation. In this fashion, multiple broker computer systems 170 and custodian broker computer systems 180 will have access to data transaction server 130 on a subscription or pay-for service basis.

Optional printer 110 and an optional fax machine 150 are standard peripheral devices that may be used for outputting transactions, reports, etc. in conjunction with the transactions processed by data transaction system 100. Optional printer 110 and an optional fax machine 150 may be directly connected to network 120 or indirectly connected via any or all of broker computer systems 170, custodian broker computer systems 180 and data transaction server 130. Finally, it should be noted that optional printer 110 and optional fax machine 150 are merely representative of the many types of peripherals that may be utilized in conjunction with data transaction system 100. It is anticipated that other similar peripheral devices will be deployed in the various preferred embodiment of the present invention and no such device is excluded by its omission in FIG. 1.

Figure 2:
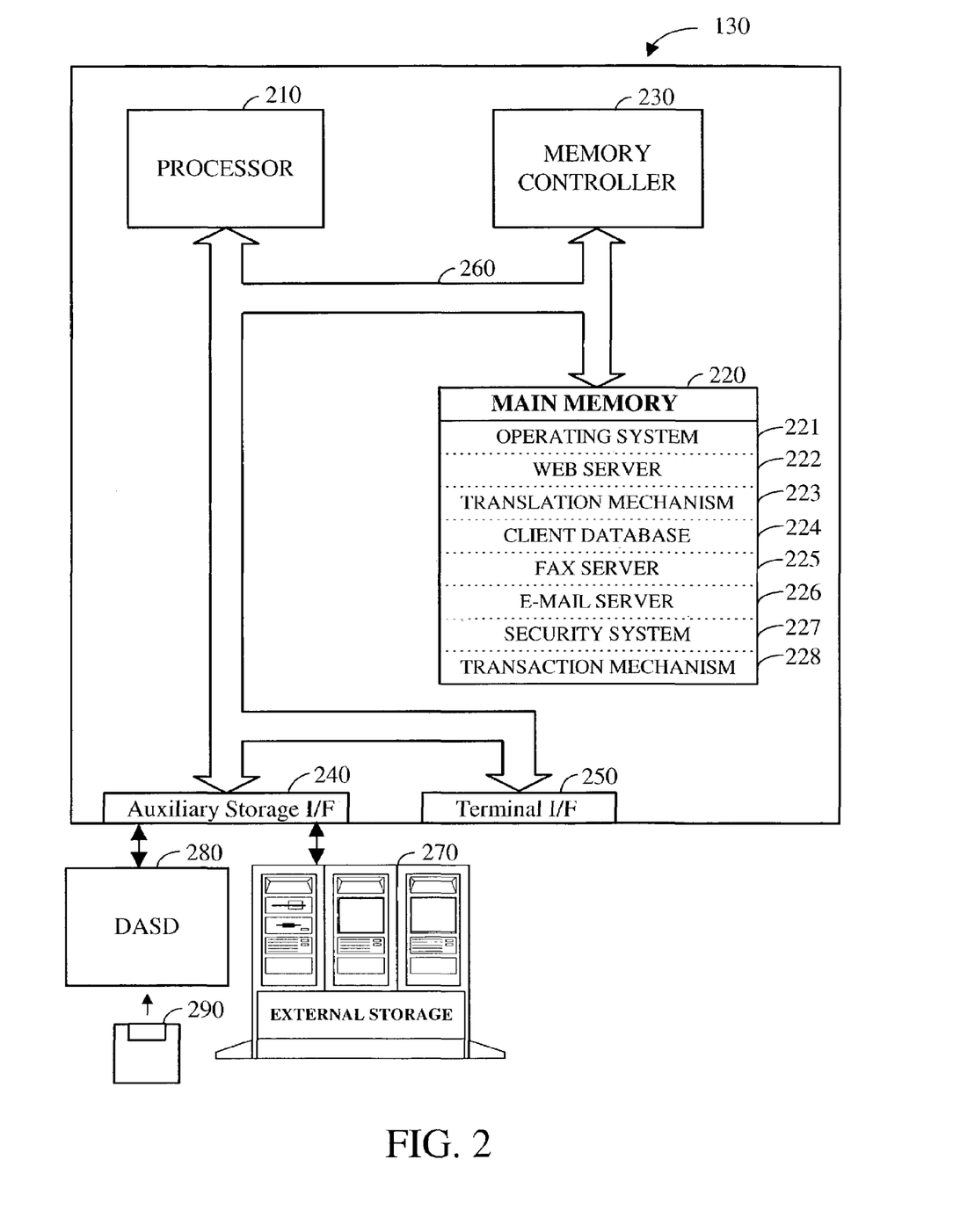
FIG. 2 is a block diagram of a data transaction server in accordance with a preferred exemplary embodiment of the present invention.

Referring now to FIG. 2, a data transaction server 130 in accordance with a preferred embodiment of the present invention is depicted. Data transaction server 130 is any suitable computer system that is capable of performing the transaction as described herein. This includes mainframe computers standard server computers and the like. Those skilled in the art will appreciate that the methods and apparatus of the present invention apply equally to any suitable computer system, regardless of whether the computer system is a complicated multi-user computing apparatus or a single user device such as a personal computer or workstation.

Data transaction server 130 suitably comprises at least one Central Processing Unit (CPU) or processor 210, a main memory 220, a memory controller 230, an auxiliary storage interface 240, and a terminal interface 250, all of which are interconnected via a bus 260. Note that various modifications, additions, or deletions may be made to data transaction server 130, including the addition of cache memory or various peripheral devices. For example, data transaction server 130 will also typically include a monitor or other display device (not shown) connected to the system bus 260. Alternatively, it is anticipated that data transaction server 130 may be a terminal without a CPU that is connected to a network as a network computer (NC). In that case, the responsibilities and functions of CPU 210 will be assumed and performed by some other device on the network. FIG. 2 is not an exhaustive illustration of any specific computer system or configuration, but is presented to simply illustrate some of the salient features of one preferred embodiment for data transaction server 130. Finally, while depicted as a single device, in certain preferred embodiments of the present invention data transaction server 130 may be implemented as a cluster of multiple data transaction servers 130. This configuration provides additional robustness for system uptime and reliability purposes.

Processor 210 is typically configured to perform the computation and control functions of data transaction server 130, and may comprise a single integrated circuit, such as a microprocessor, or may comprise any suitable number of integrated circuit devices and/or circuit boards working in cooperation to accomplish the functions of a processor. Processor 210 typically executes and operates under the control of an operating system 221 contained within main memory 220.

Auxiliary storage interface 240 is configured to allow data transaction server 130 to store and retrieve information from auxiliary storage devices, such as mass storage device 270, magnetic disk drives (e.g., hard disks or floppy diskettes) or optical storage devices (e.g., CD-ROM). One suitable storage device is a direct access storage device (DASD) 280. As shown in FIG. 2, DASD 280 may be a floppy disk drive that reads programs and data from a floppy disk 290. It is important to note that while the present invention has been (and will continue to be) described in the context of a fully functional computer system, those skilled in the art will appreciate that the various mechanisms of the present invention are capable of being implemented in a variety of ways and that the present invention applies equally regardless of the particular type of computer system deployed.

Memory controller 230, through use of a processor (not shown) that is typically separate from processor 210, is responsible for moving requested information from main memory 220 and/or through auxiliary storage interface 240 to processor 210. While for the purposes of explanation, memory controller 230 is shown as a separate entity, those skilled in the art understand that, in practice, portions of the function provided by memory controller 230 may actually reside in the circuitry associated with processor 210, main memory 220, and/or auxiliary storage interface 240.

Terminal interface 250 allows system administrators and computer programmers to communicate with data transaction server 130, normally through programmable workstations. Although data transaction server 130 depicted in FIG. 2 contains only a single main processor 210 and a single system bus 260, it should be understood that the present invention applies equally to computer systems having multiple processors and multiple system buses. Similarly, although the system bus 260 of the preferred embodiment is a typical hardwired, multi-drop bus, any connection means that supports bi-directional communication in a computer-related environment could be used, including wireless communication methodologies.

Main memory 220 most preferably contains an operating system 221, a web server 222, a translation mechanism 223, a client database 224, an optional fax server 225, an e-mail server 226, a security system 227, and a transaction mechanism 228. The term "memory" as used herein refers to any storage location in the virtual memory space of data transaction server 130. It should be understood that main memory 220 may not necessarily contain all parts of all mechanisms shown. For example, portions of operating system 221 may be loaded into an instruction cache (not shown) for processor 210 to execute, while other files may well be stored on magnetic or optical disk storage devices (not shown). In addition, although client database 224 is shown to reside in the same memory location as operating system 221, it is to be understood that main memory 220 may consist of multiple disparate memory locations, including mass storage device 270.

Operating system 221 preferably includes the software that is used to operate and control data transaction server 130. Operating system 221 is typically executed by processor 210. Operating system 221 may be a single program or, alternatively, a collection of multiple programs that act in concert to perform the functions of any typical operating system, which functions are well known to those skilled in the art.

Web server 222 can be any web server application currently known or later developed for communicating with web clients over a network such as the Internet. Examples of suitable web servers 222 include Apache servers, Linux servers, and the like. Additionally, other vendors have developed or will develop web servers that will be suitable for use with the various preferred embodiments of the present invention. Finally, while depicted as a single device, in certain preferred embodiments of the present invention web server 222 may be implemented as a cluster of multiple web servers. This configuration provides additional robustness for system uptime and reliability purposes.

Translation mechanism 223 is provided to reformat the data associated with the various transaction requests and responses transmitted between requesting broker computer systems 170 and custodian broker computer systems 180. For example, a given requesting broker computer system 170 may use a different communication protocol or file transfer protocol than a given custodian broker computer system 180. In order to successfully process a Letter of Free Funds request between the two disparate systems, translation mechanism 223 will reformat the data as necessary to be understood by each of the different systems. Using the information contained in client database 224, translation mechanism 223 can access the specific preferences and requirements for any given requesting broker computer system 170 or custodian broker computer system 180 and make the data available in the necessary form and format.

Preferably, client database 224 is a Structured Query Language (SQL) compatible database file capable of storing broker information, including names, addresses, account preferences, etc. While client database 224 is shown to be residing in main memory 220, it should be noted that client database 224 may be physically located in a location other than main memory 220. For example, client database 224 may be stored on mass storage device 270 or DASD 280 and coupled to data transaction server 130 via auxiliary storage I/F 240.

Alternatively, client database 224 may be stored at a geographically remote location that is accessible via the Internet, by utilizing any suitable Internet file transfer application. In this type of distributed database environment, client database 224 may be implemented using various techniques known to those skilled in the art to prevent data redundancy and to ensure data integrity. Additionally, in the most preferred embodiments of the present invention, information specifying file transfer protocols and specifications for communicating with broker computer systems 170 and custodian broker computer systems 180 of FIG. 1 are also contained in client database 224.

Fax server 225 is an optional component that is provided in the event a given requesting broker computer system 170 or custodian broker computer systems 180 cannot be accessed electronically. In that case, fax server 225 will coordinate with translation mechanism 223 under the control of transaction mechanism 228 to send the formatted data to the appropriate fax destination for a given client that has elected to receive communications via facsimile transmission. Similarly, fax server 225 is configured to receive inbound fax messages and, once again in conjunction with translation mechanism 223, format the incoming data for further processing by data interchange system 100.

While not required, the most preferred embodiments of transaction server 130 include an e-mail server 226. E-mail server 226 is used to send and receive various status messages and updates between requesting broker computer systems 170 or custodian broker computer systems 180, as necessary to enhance the overall process.

Security system 227 represents a security and/or encryption application for verifying access to the data contained in and transmitted by transaction server 130. Additionally, security system 227 may also provide encryption capabilities for data interchange system 100, thereby enhancing the robustness of data interchange system 100. Once again, depending on the type and quantity of information stored in client database 224, security system 227 may provide different levels of security and/or encryption for different requesting broker computer systems 170 and custodian broker computer systems 180. Additionally, the level and type of security measures applied by security system 227 may be determined by the nature of a given request and/or response.

Transaction mechanism 228 is the overall application control program for managing and directing the flow of requests in data interchange system 100. Typically, transaction mechanism 228 will communicate with operating system 221 and web server 222, invoking the appropriate action or response from translation mechanism 223, client database 224, fax server 225, e-mail server 226, and or security system 227. Finally, those skilled in the art will recognize that although the various components in main memory 220 are depicted as discrete objects, many of the components may in fact be incorporated into a single application program capable of performing the various functions of the individual components.

It is important to note that while the present invention has been (and will continue to be) described in the context of a fully functional computer system, those skilled in the art will appreciate that the various components and mechanisms of the present invention are capable of being distributed as a program product in a variety of forms, and that the present invention applies equally regardless of the particular type or location of signal bearing media used to actually carry out the distribution. Examples of signal bearing media include: recordable type media such as floppy disks (e.g., disk 290) and CD ROMS, and transmission type media such as digital and analog communication links, including wireless communication links.

Figure 3:
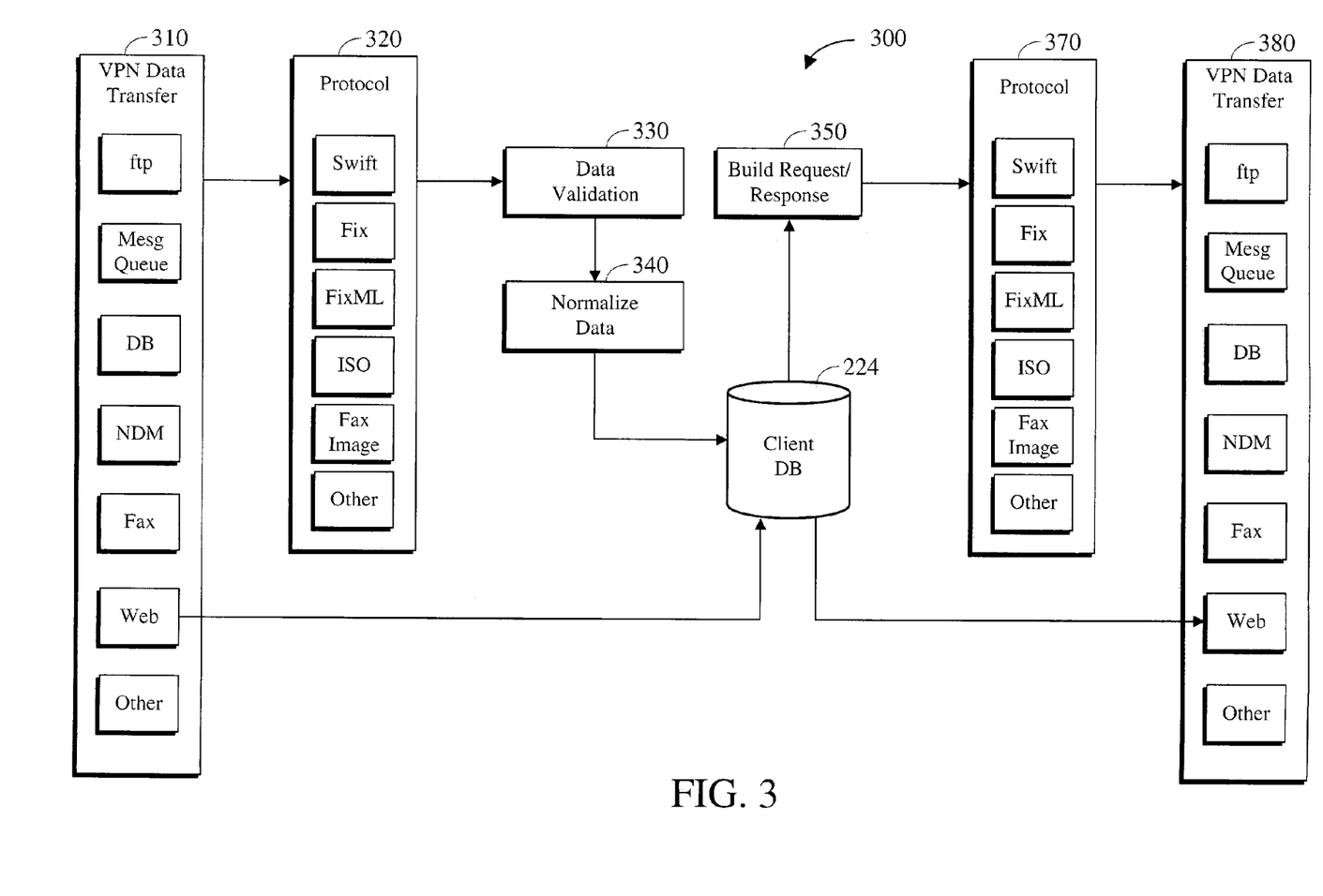
FIG. 3 is a block diagram of a universal translation mechanism for processing data operating in conjunction with the data interchange system of FIG. 1 in accordance with a preferred exemplary embodiment of the present invention.

Referring now to FIG. 3, a block diagram depicting communication process flow 300 in accordance with a preferred exemplary embodiment of the present invention is shown. As shown in FIG. 3, a typical data transmission from a given client can be received by any of several incoming data transfer protocols 310, including File Transfer Protocol (FTP), Mesg Queue, DB, NDM and others. Additionally, the each data contained in each transmission may be formatted in many different ways, as indicated by data format protocol structure 320. These transmission protocols include Swift, FIX, ISO, etc.

The "FTP" data transfer protocol refers to a connection oriented communication protocol where an FTP client connects to an FTP server and transfers a file to the FTP server. This FTP file will typically contain the data required to initiate or respond to a given desired transaction. Accordingly, the FTP server will process the data in the file and store the file in the appropriate file system. Similarly, the FTP server can transfer the file to back the same FTP client or another FTP client after processing.

The "Mesg Queue" data transfer protocol refers to a connection oriented communication protocol wherein a message queue client connects to a message queue server. The client reads a file on the server and streams the data required for the desired transaction into the server. After receiving the data, the server processes the data and stores the data in its final location, such as a file in a related file system or in an associated database.

The "DB" data transfer protocol refers to a database connection communication protocol. In this situation, a database client connects to a server and extracts data from one or more tables contained in a database stored on the server. Similarly, the client may insert data into one or more tables in the database. The information in the database can be processed and updated by the server and, in this manner, data related to requests/responses may be transferred into and out of the system.

The "NDM" data transfer protocol refers to another connection oriented communication protocol wherein a NDM client connects to an NDM server and transmits data from one or more files via a data stream to the server. This data is then processed and stored by the server in the appropriate format and in the appropriate destination, such as a file or database. After processing, the data stream may be updated and then passed on to the same NDM client or, in the case of a request, the data may be sent to a different NDM client for further processing in another system environment.

The "Fax" data transfer protocol refers to a standard facsimile transmission, using fax machines, fax servers, and telephone or other types of data transmission lines. Upon receiving a fax transmission from a client, the fax transmission can be parsed for any data relevant to the request/response. This data can then be processed and stored in a file or database, as desired and as required for additional transaction processing. Additionally, the processed data may be forwarded to another location via facsimile.

The "Web" data transfer protocol refers to the use of the Internet and various Internet-related protocols to transfer data to and from the server. Typically, the data may be entered using an XML, HTML, or ASP generated web page. This data may be stored directly into a database since the data is being collected and processed into the desired format by the underlying web page.

The "Other" data transfer protocol simply underscores the notion that the data transfer methodologies depicted in FIG. 3 are merely illustrative and not exhaustive. It is anticipated that many other data transfer methodologies known to those skilled in the art may be deployed in various systems to create multiple preferred embodiments of the present invention.

Typically, and regardless of the specific data transfer protocol selected, the received data will contain information relative to a given transaction, such as a request for a Letter of Free Funds. Included in this data will be information identifying the requesting broker, the custodian broker, the client, the amount, etc. The specific information contained in the data transmission will depend on the type of request or response being made. In the most preferred embodiments of the present invention, it will be possible to determine the source of the data transmission by using data containing "self-identifying" information. For example, by associating a specific ftp address with each different client and/or by using a different fax number for each client, or by embedding source-specific data in a file header or data stream, the source of the data transmission may be identified. Accordingly, by examining the data transmission for this type of self-identifying information, the process of discerning the source of the data transmission can be simplified and the overall process can become more efficient.

The "Swift" data format protocol is managed by an industry-owned co-operative that supplies secure messaging services and interface software to more than 7,000 financial institutions in more than 190 different countries.

The "FIX" (Finacial Information exchange) data format protocol is a messaging standard developed specifically for the real-time electronic exchange of securities transactions. FIX is a public domain specification owned and maintained by FIX Protocol, Ltd. and is promulgated to assist in defining, managing, and promoting an open protocol for real-time electronic communication between industry participants.

The "FIXML" data format protocol was devised in 1998 by FIX Protocol, Ltd. as an XML vocabulary based on the underlying FIX protocol. FIXML is designed to incorporate standard FIX messages with XML for further extensibility of the FIX protocol.

The "ISO" data format protocol refers to the standard communications protocol as promulgated by the ISO. This is a standards institute that has promulgated more than 13,000 standards for use in business, government, industry, and society at large.

The "Fax Image" data format protocol refers to a standard facsimile imaging and transmission protocol, using fax machines, fax servers, and telephone or other types of data transmission lines.

Once again, the "Other" data format protocol simply underscores the notion that the protocols depicted in FIG. 3 are merely illustrative and not exhaustive. It is anticipated that many other protocols known to those skilled in the art may be deployed in various systems to create multiple preferred embodiments of the present invention.

After receipt of the data, data validation 330 is accomplished and the data is normalized 340 for insertion into client database 224. Data validation refers to processing the data and verifying that the data meets the system-defined standards for use with the system. This can include various types of security screening, error-checking, etc. using any of those methodologies and techniques known to those skilled in the art.

Based on the information contained in client database 224 and using the received data, including the self-identifying data, a request or response 350 is constructed for transmission to the desired location. Similar to the process used when receiving data, the outgoing data will be formulated and transmitted to the desired location utilizing an outgoing protocol 370 and an outgoing transfer methodology 380. The precise format and protocol used for transferring the outgoing data to the desired location will be accomplished by referencing the data transmission requirements for the desired destination as contained in client database 224. In this fashion, data from virtually any location, transmitted via virtually any protocol and employing virtually any transfer methodology, can be accommodated and forwarded to the appropriate destination in the proper format for receipt. This allows data interchange system 100 to function as a virtual "clearing house" for various types of transaction, including requests for Letters of Free Funds.

It is anticipated that the ubiquitous and flexible nature of the communication process enabled by the various preferred embodiments of the present invention will allow for heretofore incompatible systems to be interconnected. Disparate client systems will be able to transmit and receive requests/responses from other systems and the overall effect will be a more efficient and effective means of processing data transaction such as Letters of Free Funds.

Figure 4:
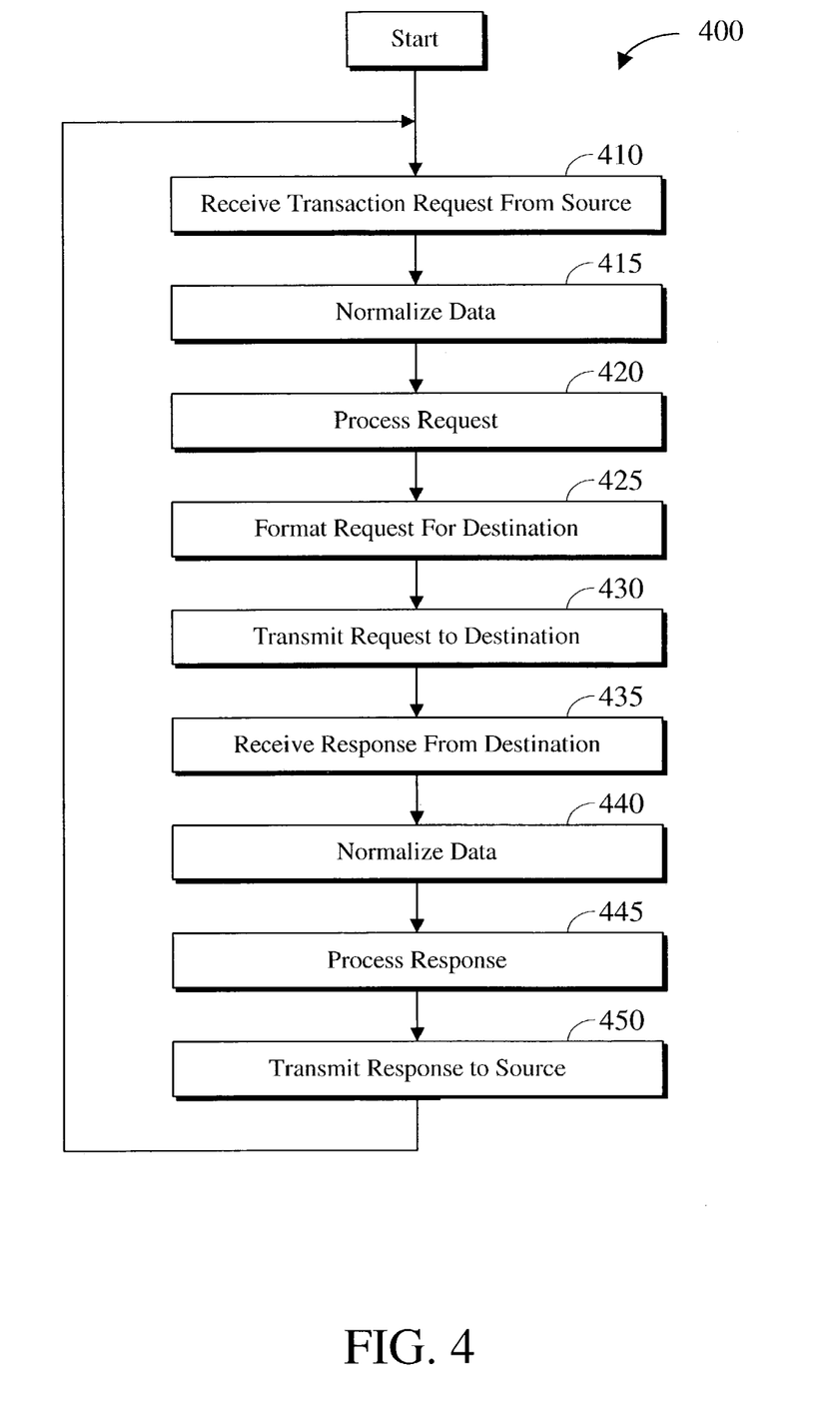
FIG. 4 is a flow diagram for performing data transactions in conjunction with the data interchange system in accordance with a preferred exemplary embodiment of the present invention.

Referring now to FIG. 4, a flow chart depicting a method 400 for processing data transaction in accordance with a preferred embodiment of the present invention is shown. As shown in FIG. 4, method 400 begins with the receipt of a transaction request from a source (step 410). The source may be any broker/dealer that is authorized to utilize the data transaction system. The transaction request may be a Letter of Free Funds request, a message regarding a previously requested transaction, or a response that may be required to complete a given transaction. Transaction requests/responses may be transmitted and processed individually or in "batches," depending on the specific system implementation. Additionally, in the most preferred embodiments of the present invention, the source of the transaction request is identified as each transaction request is received.

Once the transaction request has been received and the source identified, the data is normalized for insertion into the transaction database (step 415). The data will then be inserted into the database and the request will be processed (step 420), including identifying the destination. After the destination has been identified, the appropriate request format for that destination can be identified and the request will be formatted accordingly (step 425) and transmitted to the appropriate destination (step 430). As a part of this process, one or more "status flags" may be set to track the status of the request and/or the reply. For example, a "request initiation" flag may be set to denote that a request has been received and relayed or transferred on to another location for processing. The request initiation flag will specifically identify the given request and will allow the system to track the request throughout the process. It should be noted that the request initiation flag may be set in any of steps 410-430, depending on the specific implementation.

Once the request is received by the destination, a "request received" flag may be set. The request received flag will serve to validate the successful receipt of the request by the desired destination. Some time after the request has been received by the destination, a response to the request will be generated by the destination and received (step 435). As part of this process, a "request processed" flag will be set by the destination, verifying that it has completed processing the request. Once again, the data will be normalized (step 440) and inserted into the database. The response will then be processed, including formatting the response as necessary for the source (step 445) and then transmitted to the source (step 450). As part of this process, a "response sent" flag may be set. The response sent flag will validate completion of cycle for each given request. The various status flags described herein are merely illustrative of one type of tracking methodology that may be used with the system to track the progress of a request/response in the system and to validate successful completion of the necessary processing for a given request/response. In this fashion, the system can respond to requests for status updates regarding a given transaction and provide a robust troubleshooting capacity for the users of the system. Additionally, it should be noted that this is typically an iterative process and may be repeated as necessary to accomplish any given data transaction.

From the foregoing description, it should be appreciated that the universal transaction mechanism for translating and sharing data provides a unique methodology for data transactions, thereby streamlining the exchange of financial information and approvals utilized in many brokerage transactions, including the verification of free funds through an electronic Letter of Free Funds in compliance with Regulation T.

Lastly, it should be appreciated that the illustrated embodiments are preferred exemplary embodiments only, and are not intended to limit the scope, applicability, or configuration of the invention in any way. Rather, the foregoing detailed description provides those skilled in the art with a convenient road map for implementing the preferred exemplary embodiments of the invention. Accordingly, it should be understood that various changes may be made in the function and arrangement of elements described in the exemplary preferred embodiments without departing from the spirit and scope of the invention as set forth in the appended claims.

The invention claimed is:

1. An apparatus comprising:
   at least one processor;
   a memory coupled to said at least one processor;
   a client database residing in said memory;
   a transaction mechanism residing in said memory and being executed by said at least one processor, said transaction mechanism receiving at least one request from a source and relaying said at least one request from said source to a destination, said transaction mechanism receiving at least one reply from said destination in response to said request, said transaction mechanism relaying said reply to said source from said destination;
   a translation mechanism residing in said memory and being executed by said at least one processor, said translation mechanism translating said at least one request from a first data format into a second data format prior to said at least one request being relayed from said source to said destination, said translation mechanism translating said at least one reply from a third data format to a fourth data format prior to said at least one reply being relayed to said source, wherein at least one of said first data format and said second data format and said third data format and said fourth data format are selected by parsing said client database; and
   at least one output device coupled to said at least one processor, said at least one output device comprising one of a printer, a fax machine and a computer monitor, said at least one output device printing or displaying said at least one reply.

2. The apparatus of claim 1 wherein said first data format and said fourth data format are identical.

3. The apparatus of claim 1 wherein said second data format and said third data format are identical.

4. The apparatus of claim 1 wherein:
   said first data format and said fourth data format are identical; and
   said second data format and said third data format are identical.

5. The apparatus of claim 1 further comprising an operating system residing in said memory.

6. The apparatus of claim 1 further comprising a web server residing in said memory.

7. The apparatus of claim 1 further comprising a fax server residing in said memory, said fax server being configured to send and/or receive at least one fax transmission to and/or from said source and/or said destination.

8. The apparatus of claim 1 further comprising an e-mail server residing in said memory, said e-mail server being configured to send and/or receive at least one e-mail transmission to and/or from said source and/or said destination.

9. The apparatus of claim 1 further comprising a security mechanism residing in said memory, said security mechanism being configured to perform encryption and decryption of said at least one request and said at least one reply.

10. The apparatus of claim 1 wherein said at least one request comprises a request for a verification of free funds in compliance with Regulation T.

11. The apparatus of claim 1 wherein said at least one reply comprises a response to a request for a verification of free funds in compliance with Regulation T.

12. The apparatus of claim 1 wherein said at least one request comprises a request containing self-identifying information.

13. The apparatus of claim 1 wherein said at least one reply comprises a reply containing self-identifying information.

14. An apparatus comprising:
   at least one processor;
   a memory coupled to said at least one processor;
   an operating system residing in said memory;
   a client database residing in said memory;
   a transaction mechanism residing in said memory and being executed by said at least one processor, said transaction mechanism receiving at least one request for a verification of free funds in compliance with Regulation T from a source and relaying said at least one request for a verification of free funds in compliance with Regulation T from said source to a destination, said transaction mechanism receiving at least one reply to said at least one request for a verification of free funds in compliance with Regulation T from said destination in response to said at least one request for a verification of free funds in compliance with Regulation T, said transaction mechanism relaying said reply to said source from said destination;
   a translation mechanism residing in said memory and being executed by said at least one processor, said translation mechanism translating said at least one request for a verification of free funds in compliance with Regulation T from a first data format into a second data format prior to said at least one request for a verification of free funds in compliance with Regulation T being relayed from said source to said destination, said translation mechanism translating said at least one reply to said request for a verification of free funds in compliance with Regulation T from a third data format to a fourth data format prior to said at least one reply to said request for a verification of free funds in compliance with Regulation T being relayed to said source, wherein at least one of said first data format and said second data format and said third data format and said fourth data format are selected by parsing said client database; and at least one output device coupled to said at least one processor, said at least one output device comprising one of a printer, a fax machine and a computer monitor, said at least one output device printing or displaying said at least one reply.

15. The apparatus of claim 14 wherein:
said first data format and said fourth data format are identical; and
said second data format and said third data format are identical.

16. The apparatus of claim 14 further comprising a fax server residing in said memory, said fax server being configured to send and/or receive at least one fax transmission to and/or from said source and/or said destination.

17. The apparatus of claim 14 further comprising an e-mail server residing in said memory, said e-mail server being configured to send and/or receive at least one e-mail transmission to and/or from said source and/or said destination.

18. The apparatus of claim 14 further comprising a security mechanism residing in said memory, said security mechanism being configured to perform encryption and decryption of said at least one request and said at least one reply.

19. The apparatus of claim 14 wherein said at least one request for a verification of free funds in compliance with Regulation T comprises a request containing self-identifying information.

20. The apparatus of claim 14 wherein said at least one reply to said at least one request for a verification of free funds in compliance with Regulation T comprises a reply containing self-identifying information.

21. A method comprising the steps of:
receiving at least one request from a source, said at least one request being formatted according to a first data format, said at least one request being received via a first transmission protocol;
translating said at least one request from said first data format to a second data format;
relaying said at least one request to a destination via a second transmission protocol;
receiving at least one reply to said at least one request from said destination, said at least one reply being received via a third transmission protocol, said at least one reply being formatted according to a third data format;
translating said at least one reply from said third data format to a fourth data format; and
relaying said at least one reply to said source via a fourth transmission protocol; and
using at least one output device to print or display said at least one reply, said at least one output device comprising one of a printer, a fax machine and a computer monitor.

22. The method of claim 21 wherein:
said first data format and said fourth data format are identical; and
said second data format and said third data format are identical.

23. The method of claim 21 wherein:
said first transmission protocol and said fourth transmission protocol are identical; and
said second transmission protocol and said third transmission protocol are identical.

24. The method of claim 21 further comprising the step of setting at least one flag to track the status of said at least one request and/or said at least one reply.

25. The method of claim 24 wherein said step of setting at least one flag to track the status of said at least one request and/or said at least one reply comprises the step of setting a plurality of status flags to track the status of said at least one request and/or said at least one reply.

26. A program product comprising:
a transaction mechanism configured to receive at least one request from a source and relaying said at least one request from said source to a destination, said transaction mechanism being configured to receive at least one reply from said destination in response to said request, said transaction mechanism being configured to relay said reply to said source from said destination;
a translation mechanism being configured to translate said at least one request from a first data format into a second data format prior to said at least one request being relayed from said source to said destination, said translation mechanism being configured to translate said at least one reply from a third data format to a fourth data format prior to said at least one reply being relayed to said source; and
signal bearing media bearing said transaction mechanism and said translation mechanism, said signal bearing media comprising one of a floppy disk and a CD ROM.

27. The program product of claim 26 wherein the signal bearing media comprises recordable media.

28. The program product of claim 26 wherein the signal bearing media comprises transmission media, said transmission media comprising a physical cable.

29. The program product of claim 26 wherein said at least one request comprises a request for a verification of free funds in compliance with Regulation T.

30. The program product of claim 26 wherein said at least one reply comprises a response to a request for a verification of free finds in compliance with Regulation T.

* * * * *